(12) United States Patent
Ashmore et al.

(10) Patent No.: US 7,937,095 B2
(45) Date of Patent: *May 3, 2011

(54) COMBINING A MARKER WITH CONTEXTUAL INFORMATION TO DELIVER DOMAIN-SPECIFIC CONTENT

(75) Inventors: Bradley C. Ashmore, Mountain View, CA (US); Ken D'Amico, Saratoga, CA (US)

(73) Assignee: Knowtate, Inc., San Jose, CA (US)

(*) Notice: Subject to any disclaimer, the term of this patent is extended or adjusted under 35 U.S.C. 154(b) by 872 days.

This patent is subject to a terminal disclaimer.

(21) Appl. No.: 11/683,378

(22) Filed: Mar. 7, 2007

(65) Prior Publication Data
US 2007/0147280 A1 Jun. 28, 2007

Related U.S. Application Data

(63) Continuation-in-part of application No. 10/800,050, filed on Mar. 11, 2004, now Pat. No. 7,266,380, which is a continuation-in-part of application No. 09/833,207, filed on Apr. 10, 2001, now Pat. No. 6,738,630.

(51) Int. Cl.
*H04W 24/00* (2009.01)
*H04M 3/42* (2006.01)
(52) U.S. Cl. ............. 455/456.3; 455/414.2; 455/456.1
(58) Field of Classification Search .............. 455/456.3, 455/414.2, 422.1, 456.1, 456.2, 457; 340/990, 340/995.1, 995.13, 539.13, 539.28, 905
See application file for complete search history.

(56) References Cited

U.S. PATENT DOCUMENTS

| 5,579,535 A | 11/1996 | Orlen et al. |
| 5,625,668 A | 4/1997 | Loomis et al. |
| 5,933,829 A | 8/1999 | Durst et al. |

(Continued)

FOREIGN PATENT DOCUMENTS

JP 08-076706 A 3/1996

(Continued)

OTHER PUBLICATIONS

"i3 Mobile and BarPoint.com to Provide Product Information and Price Comparisons Via Wireless Devices," PR Newswire, Sep. 12, 2000, [online], [retrieved on Jun. 13, 2001]. Retrieved from the Internet <URL: http://www.findarticles.com/cf_0/m4PRN/2000_Sept_12/65157440/print.jhtml>, 3 pages.

(Continued)

*Primary Examiner* — Sonny Trinh
(74) *Attorney, Agent, or Firm* — Fenwick & West LLP

(57) ABSTRACT

A system and method provides content to a mobile device in response to a marker received from the device and an associated context. A mobile device user initiates delivery of content or another action by entering the marker into the mobile device. The mobile device transmits the marker to a mobile network support system having a context server for supplying a context for the marker. The support system forms a message including the marker and context, and sends it to a content server. The content server uses the context to map the marker to a domain, retrieves from a content database the content identified by the marker and domain, and sends the content to the mobile network support system or performs another action with the content. The mobile network support system then transmits the content back to the mobile device.

21 Claims, 4 Drawing Sheets

U.S. PATENT DOCUMENTS

| | | | |
|---|---|---|---|
| 5,946,618 A | 8/1999 | Agre et al. | |
| 5,978,773 A | 11/1999 | Hudetz et al. | |
| 6,014,090 A * | 1/2000 | Rosen et al. | 340/905 |
| 6,091,956 A | 7/2000 | Hollenberg | |
| 6,108,533 A | 8/2000 | Brohoff | |
| 6,108,656 A | 8/2000 | Durst et al. | |
| 6,122,520 A | 9/2000 | Want et al. | |
| 6,154,745 A | 11/2000 | Kari et al. | |
| 6,199,048 B1 | 3/2001 | Hudetz et al. | |
| 6,349,203 B1 * | 2/2002 | Asaoka et al. | 455/414.3 |
| 6,353,398 B1 | 3/2002 | Amin et al. | |
| 6,389,290 B1 | 5/2002 | Kikinis et al. | |
| 6,405,034 B1 | 6/2002 | Tijerino | |
| 6,526,275 B1 | 2/2003 | Calvert | |
| 6,580,914 B1 * | 6/2003 | Smith | 455/456.6 |
| 6,590,529 B2 * | 7/2003 | Schwoegler | 342/357.13 |
| 6,608,556 B2 * | 8/2003 | De Moerloose et al. | 340/501 |
| 6,618,593 B1 | 9/2003 | Drutman et al. | |
| 6,738,630 B2 | 5/2004 | Ashmore | |
| 6,944,447 B2 * | 9/2005 | Portman et al. | 455/422.1 |
| 7,089,022 B1 | 8/2006 | Kaplan | |
| 7,130,641 B1 | 10/2006 | Al-Khashti et al. | |
| 7,249,100 B2 * | 7/2007 | Murto et al. | 705/50 |
| 7,532,899 B2 * | 5/2009 | Wilson et al. | 455/456.3 |

FOREIGN PATENT DOCUMENTS

| | | |
|---|---|---|
| JP | 9-008917 | 1/1997 |
| JP | 11-146080 | 5/1999 |
| JP | 11-187469 | 7/1999 |
| JP | 11-285053 | 10/1999 |
| JP | 11-328077 | 11/1999 |
| JP | 2000-020433 | 1/2000 |
| JP | 2000-285056 | 10/2000 |
| JP | 2001-043167 | 2/2001 |
| WO | WO 00/45302 A1 | 8/2000 |
| WO | WO 00/67155 A2 | 11/2000 |

OTHER PUBLICATIONS

Trager, "The Click-And-Mortar Customer Arrives," Inter@ctive Week, Feb. 16, 2000, [online], [retrieved on Jun. 13, 2001]. Retrieved from the Internet <URL: http://www.zdnet.com/filters/printerfriendly/0,6061,2438057-35,00.html>, 3 pages.

The Kelsey Group, Inc., "InfoSpace Launches M-Commerce Service; Buys IQorder," [online], [retrieved on Jun. 13, 2001]. Retrieved from the Internet <URL: http://www.kelseygroup.com/clp/clp000425ae.htm>, 2 pages.

Infospace, Inc., Quarterly Report (SEC form 10-Q), Aug. 11, 2000, [online], [retrieved on Jun. 13, 2001]. Retrieved from the Internet <URL: http://biz.yahoo.com/e/000811/insp.html>, 14 pages.

Infospace, Inc., "Powering Integrated, Private-Labeled Services to any Wireless Device," [online], [retrieved on Jun. 13, 2001]. Retrieved from the Internet <URL: http://www.infospace.com/info/redirs_all.htm?pgtarg=abtwl&>, 2 pages.

ZDNet UK, "Click! Turning Old Radio Into New Media," Jan. 25, 2000, [online], [retrieved on Jun. 13, 2001]. Retrieved from the Internet <URL: http://news.zdnet.co.uk/story/0,,s2076550,00.html>, 2 pages.

Business Week E.Biz, "Scan Click Shop (int'l edition) AirClic's Bar Codes Let Shoppers Download Ads and Order Goods via Mobile Phone," Jun. 5, 2000, [online], [retrieved on Jun. 13, 2001]. Retrieved from the Internet <URL: http://www.businessweek.com:/2000/00_23/b3684037.htm?scriptFramed>, 2 pages.

AirClic Inc., Home Page, [online], [retrieved on Jun. 13, 2001]. Retrieved from the Internet <URL: http://www.airclic.com/>, 1 page.

Symbol Technologies, "Motorola, Symbol Technologies, Connect Things and AirClic Form New Company to Drive the Growth of E-commerce through One-Scan Access to the Internet," Jun. 15, 2000, [online], [retrieved on Jun. 13, 2001]. Retrieved from the Internet <URL: http://www.symbol.com/news/pressreleases/pr_motor.html>, 5 pages.

Eastern Technology Council, Member Directory, [online], [retrieved on Jun. 13, 2001]. Retrieved from the Internet <URL: http://www.techcouncil.org/detail.cfm?TechCouncilID=1359>, 2 pages.

"Competition," [online], [retrieved on Jun. 13, 2001]. Retrieved from the Internet <URL: http://filebox.vt.edu/users/ddiperna/website/COMPETITION.htm>, 1 page.

BarPoint.com, "About Us," [online], [retrieved on Jun. 13, 2001]. Retrieved from the Internet <URL: http://www.barpoint.com/cgi-bin/barp.../template.jsp?template_type=Company&title=About_Us>, 1 page.

Voelker et al., "Mobisaic: An Information System for a Mobile Wireless Computing Environment," Department of Computer Science and Engineering, University of Washington, Sep. 19, 1994, 7 pages.

Badrinath, "A WWW-based Location-Dependent Information Service for Mobile Clients," Jul. 17, 1995, Rutgers University Department of Computer Science, [online], [retrieved on Jun. 13, 2001]. Retrieved from the Internet <URL: http://www.cs.rutgers.edu/~navas/dataman/papers/loc_dep_mosaic/Overview.html>, 26 pages.

ScreamingMedia, Business Wire, "Sonata Leads the Way by Integrating Wireless Ad Serving with Location and Time Sensitive Delivery Capabilities," Sep. 21, 2000, [online], [retrieved on Jun. 13, 2001]. Retrieved from the Internet <URL: http://industry.java.sun.com/javanews/stories/story2/0,1072,29786,00.html>, 3 pages.

Niedzwiadek, "Java™ Location Services: The New Standard for Location-enabled e-Business," [online], [retrieved on Jun. 13, 2001]. Retrieved from the Internet <URL:http://www.jlocationservices.com/company/ImageMatters/javalocationServices.html>, 17 pages.

Nokia.com, Presentation, [online], [retrieved on Jun. 13, 2001]. Retrieved from the Internet <URL: http://www-nrc.nokia.com/ip-location/location-services-hill.ppt>, 5 pages.

Directionsmag.com, "Vicinity Teams with AT&T Wireless to Provide Location-Based Application for AT&T Digital PocketNet Service," [online], [retrieved on Jun. 13, 2001]. Retrieved from the Internet <URL: http://www.directionsmag.com/pressreleases.asp?PressID=1804>, 3 pages.

Internet Engineering Task Force, "Some Scenarios for an ISL Architecture," Mar. 10, 2000, [online], [retrieved on Jun. 13, 2001]. Retrieved from the Internet <URL: http://www.ietf.org/internet-drafts/draft-korkea-aho-isl-scenarios-00.txt>, 11 pages.

Office Action and Translation, Japanese Patent Application No. 2004-571486, Jul. 31, 2007, 8 Pages.

Office Action, Canadian Patent Application No. 2,443,558, Jun. 13, 2007, 5 Pages.

PCT International Search Report, PCT Application No. PCT/US2002/10488, Jun. 17, 2002, 4 pages.

PCT Written Opinion, PCT Application No. PCT/US2002/10488, Dec. 10, 2002, 6 pages.

PCT International Preliminary Examination Report, PCT Application No. PCT/US2002/10488, Jun. 11, 2003, 5 pages.

Japanese Office Action, Japanese Patent Application No. 2004-571486, Feb. 26, 2008, 4 pages.

Japanese Office Action, Japanese Patent Application No. 2004-571486, May 26, 2009, 6 pages.

European Patent Office Communication, European Patent Application No. 02 76 1997, Oct. 20, 2009, 3 pages.

European Patent Office Communication, European Patent Application No. 02 761 997.2, Oct. 11, 2010, five pages.

\* cited by examiner

COMBINING A MARKER WITH CONTEXTUAL INFORMATION TO DELIVER DOMAIN-SPECIFIC CONTENT

CROSS-REFERENCE TO RELATED APPLICATIONS

This application is a continuation-in-part of application No. 10/800,050, filed Mar. 11, 2004, now U.S. Pat. No. 7,266,380, which is a continuation-in-part of Application No. 09/833,207, filed Apr. 10, 2001, now U.S. Pat. No. 6,738,630, all of which are incorporated herein by reference.

FIELD OF THE INVENTION

This invention relates generally to wireless technology, and particularly to providing information to wireless mobile devices.

BACKGROUND OF THE INVENTION

With the rapid expansion of wireless technology, many hand-held mobile devices are now capable of various applications, such as performing stock trades, sending/receiving text messages, etc. As wireless technology becomes more pervasive, it opens up new windows for companies and content providers to deliver personalized and localized information to mobile device holders. For example, a mobile device holder on the move may need information such as local weather, local maps, and/or directions to local hotels and restaurants, and it is desirable to deliver this information directly to the mobile device.

Companies and content providers do not usually know what information a mobile device holder may desire at a particular time and location. Some companies and content providers have designed applications to push information to mobile devices based on the assumption that at least some of the device holders are at locations where the information is useful. However, as usually happens, a large percentage of this information is not useful to the vast majority of mobile device users. This unwanted information can flood the mobile devices and consume bandwidth, memory, and battery power.

For these reasons, it is more efficient for a mobile device user to initiate the delivery of desired information, for example, by entering the universal resource locater ("URL") of a website holding the desired information. On the other hand, a mobile device user may be limited by the capabilities of the mobile device. For example, a cell phone has a small screen and no convenient way to input long text strings. The user of the cell phone may find it easier to dial "411" than to input names or addresses via multiple button presses in order to make use of a wireless directory look-up service. Also, much like the current concerns with people driving and using a cell phone, there are safety issues related to people in automobiles trying to obtain content on the Internet by entering long strings of URLs. Moreover, a URL is often not easy to memorize. Therefore, a user may have to go through lengthy searches on the Internet to find a desired website. These searches consume time and battery power, and are not practical when the user is driving a vehicle.

Therefore, there is a need in the art for a method and system for providing desired content to a mobile device holder without the aforementioned disadvantages.

SUMMARY OF THE INVENTION

The present invention meets the above need by assigning a short identifier, called a "marker," to an entity about which the mobile device user is interested in obtaining information. In one embodiment of the present invention, every marker is associated with a particular domain, such as a geographic area. Markers can be re-used in different domains.

In one embodiment, the present invention utilizes a mobile network support system and a content server. The mobile device user initiates the delivery of the desired content or another action by entering the marker into a mobile device. The mobile device transmits the marker to the mobile network support system. Preferably, a context server within the mobile network support system determines a context for the marker, such as the geographic location of the mobile device. The context server can determine the context by querying the user of the mobile device. Then, the mobile network support system sends a message including the marker and the context to the content server.

The content server is in communication with a content database, which stores content associated with markers for specified domains. A domain mapping module within the content server uses the context information to explicitly and/or implicitly map the marker to a domain. The content server retrieves the content referenced by the given marker and domain from the content database and sends it to the mobile network support system, which then transmits the content to the mobile device. Alternatively, the content server uses the content to contact the entity associated with the marker on behalf of the mobile device user or performs some other action.

DETAILED DESCRIPTION OF THE INVENTION

Figure 1:
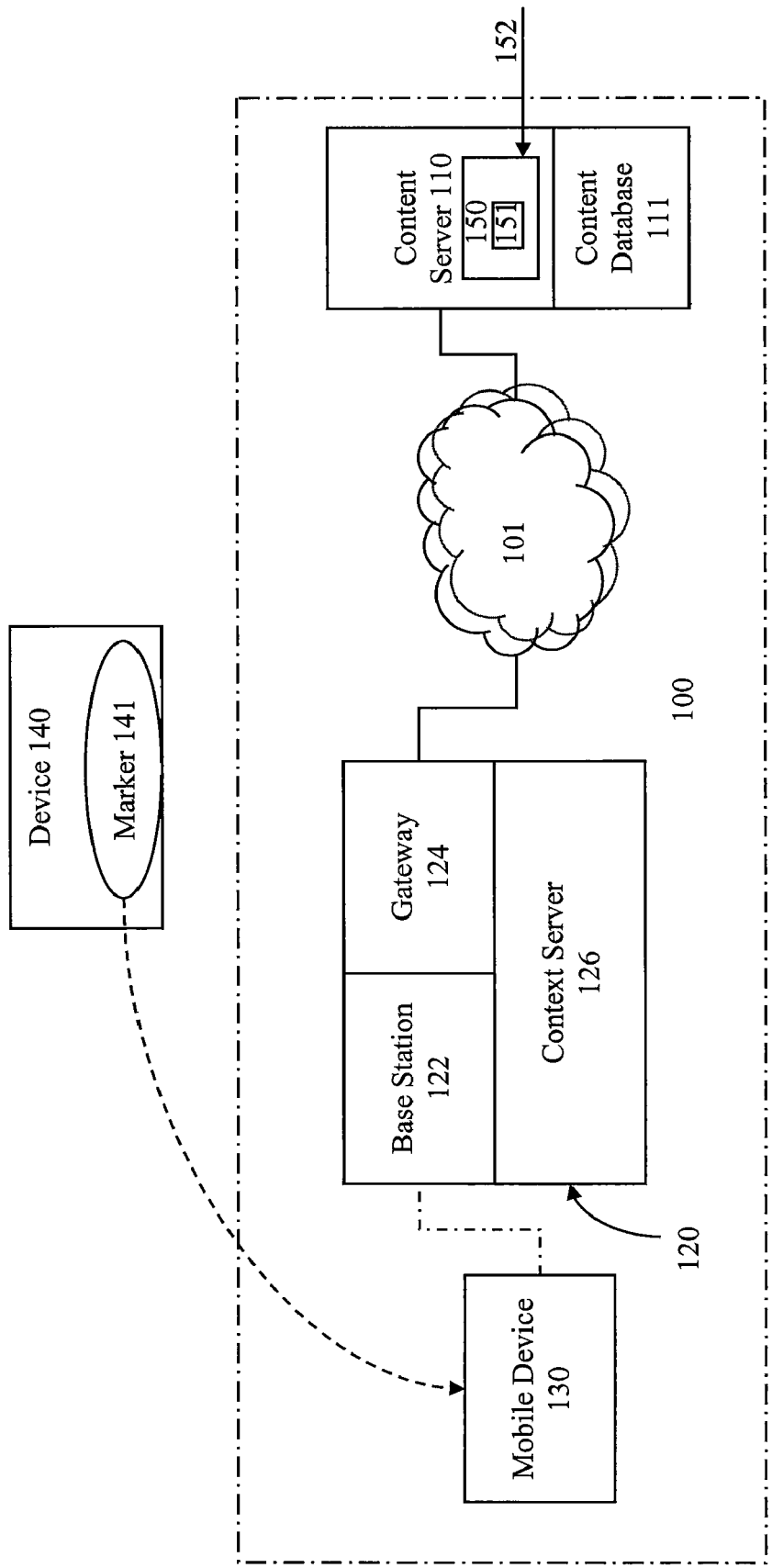
FIG. 1 is a block diagram illustrating a system for providing content to a mobile device according to an embodiment of the present invention.

FIG. 1 is a block diagram illustrating a system 100 for providing content to a mobile device 130, according to an embodiment of the present invention. The system 100 includes a content server 110 coupled to a network 101, such as the Internet, a mobile network support system 120 in communication with the network 101, and the mobile device 130. The system 100 makes use of a display 140 for informing a user of the mobile device 130 of a marker 141.

The marker 141 is a number, a text string, a pictogram, or any other symbol or series of symbols that the mobile device user can enter into his or her mobile device 130 to request content. Preferably, the marker 141 is a short number, such as "42," that is easy to read, remember, and enter into the mobile device 130. The marker 141 may also be a word, such as "food," "traffic," or a business name, a short phrase, and/or a particular color or sound.

In general, the marker 141 is associated with an entity such as a restaurant, hotel, theater, store, corporation, school, or road sign. In addition, a marker 141 may be associated with more general concepts, such as weather, traffic conditions, Mexican food, etc. Preferably, the mobile device user uses the marker 141 to obtain information about the entity or concept associated with the marker. Typically, this information is in the form of content, such as restaurant menus, theater show times, or traffic conditions.

However, there may be instances where the mobile user uses the marker 141 to obtain a service or cause an event to occur that does not directly provide additional information to the user. For example, the user may use the marker 141 to cause content to be mailed, electronically or otherwise, to an address associated with the user. In another example, the user may use the marker 141 to establish a connection with an entity such as a reservation service so that the user can provide and/or obtain additional information. Regardless, this description refers to the mobile user as using the marker 141 to obtain "content." It will be understood by those of ordinary skill in the art that "content" includes all possible benefits that may accrue to the mobile user through the use of the marker 141.

In a preferred embodiment of the present invention, the marker 141 is valid in view of one or more particular types of domains. Possible types of domains for a marker include geographic areas, times, dates, and/or events. A domain can be contiguous or discontiguous. In a preferred embodiment of the present invention, the domain is one or more geographical areas. Examples of geographical areas that may be defined as domains include particular counties, cities, towns, districts, school campuses, shopping centers, buildings, and geographic areas surrounding the marker 141 or some other location, such as the areas around particular roads or highways, paths formed by bus routes, and cellular telephone base stations. A given domain can have multiple markers 141 that are valid for that domain. Since a meaning for a particular marker 141 is valid for only a particular domain, a marker 141 can be reused and have a different meaning in other domains.

In one embodiment of the present invention, the marker 141 is illustrated on a display 140, such as a billboard or other physical object having a fixed location and/or known to reside in a prescribed location or volumetric region. For example, the display 140 can illustrate the marker 141 as part of an advertisement and/or together with other characteristics of the entity with which the marker 141 is assigned, such as a sign at a store, restaurant, motel, theater, school, etc. The display 140 can also be a mobile object that either moves through a known domain or otherwise makes apparent a domain for the marker 141. For example, a bus might display the message "Enter '42' for traffic information." Since the route of the bus is known, the domain of the marker 141 is also known. In another example, a matchbook or phonebook, displays the message "When in San Jose, enter marker '42' for local weather information." In this latter example, the domain for which the marker 141 is valid is explicitly specified; the marker may have another meaning outside of San Jose.

Alternatively, the display 140 can be anything else through which the mobile user learns about the marker 141. For example, the display 140 can be orally or visually communicated via a radio or television. For example, a radio advertisement might say "Enter '42' for locations of theatres near you showing 'Star Wars: Episode Two' starting within the next two hours." The display 140 may also be a personal computer or any other device through which the mobile device user learns about the marker 141.

The mobile device 130, to which the mobile device user preferably has direct access, is preferably a wireless device that can accept input from and provide output to the mobile device user in various forms. For example, the mobile device 130 can accept input as keypad presses, spoken words or phrases, and/or direct electronic data input. Likewise, the mobile device 130 can provide output as text messages, icons or other pictograms, video, and/or audio. Examples of mobile devices include cellular telephones, satellite telephones, Personal Digital Assistants (PDAs), pagers, portable computers, and in-vehicle communications systems such as the Onstar system available from General Motors Corporation. Preferably, the mobile device 130 supports the Wireless Application Protocol (WAP), however, it should be understood that the present invention works with wireless and/or wired devices that support WAP or other protocols. For example, the mobile device 130 may support standard telephony protocols, such as dual-tone multi-frequency ("DTMF," or "touch-tone") instead of or in addition to other protocols such as WAP. The terms "mobile device" and "wireless device," as used herein, are also intended to include devices that are in fact not mobile and/or wireless.

The mobile device 130 communicates via wireless and/or wired technologies with a base station 122 in a mobile network support system 120. The base station 122 is typically either ground-based or satellite-based depending upon the type of communication utilized by the mobile device 130. For example, if the mobile device 130 is a cellular phone, the base station 122 preferably includes a cellular base antenna and associated hardware and software for engaging in two-way communications with the cellular phone. If the mobile device 130 is a satellite-based telephone, the base station 122 preferably includes the hardware and software for supporting satellite uplink and downlink capabilities. Alternatively, if the mobile device 130 is a laptop having a network connection, the base station 122 may be simply an Internet server maintained by an Internet Service Provider (ISP) or other entity.

In a preferred embodiment of the present invention, the base station 122 communicates with multiple mobile devices simultaneously through radio links using an established protocol, such as WAP or the i-Mode protocol from NTT DoCoMo. WAP is a standard for providing cellular phones, pagers and other handheld devices with secure access to e-mail and text-based Web pages. WAP provides an environment for wireless applications including a wireless counterpart of the Transmission Control Protocol/Internet Protocol (TCP/IP) and a framework for telephony integration such as call control and phone book access. WAP supports the Wireless Markup Language (WML), which is a tag-based language allowing standard EXtensible Markup Language (XML) and Hypertext Markup Language (HTML) tools to be used to develop WAP applications. WAP also uses WML-Script, a compact JavaScript-like language that runs in limited memory. In addition, WAP supports handheld input methods such as a keypad and voice recognition, and requires only a minimum functionality in the mobile device. i-Mode is a packet-based information service for mobile phones. i-Mode provides Web browsing, e-mail, calendar, chat, games and customized news. i-Mode uses a proprietary display language called cHTML.

The mobile network support system 120 also preferably includes a context server 126 for providing contextual information for markers 141 in messages received from mobile devices 130. In general, the context server 126 receives information from the base station 122 and/or the mobile device 130 and determines the context associated with the marker 141 sent by the device. As mentioned above, in a preferred embodiment of the present invention the context is the geographic location of the mobile device 130. In one embodiment, the context server 126 determines this location from the base station 122 or network that received the signal from the mobile device 130.

The context information may include data such as a heading, velocity, and altitude for the mobile device 130. To provide this more detailed context information, the context server 126 or base station 126 may utilize technologies including overlay triangulation based on timing or angle of signal transmission and reception at the mobile device 130 and/or base station 122. Such triangulation typically uses Enhanced Observed Time Difference (E-OTD) and Time of Arrival (TOA) information. Alternatively, global positioning system (GPS) technology may be included in the mobile device 130. In this latter case, an embodiment of the present invention may lack or otherwise not use the functionality of the context server 126 because the context information is received directly from the mobile device 130.

Depending upon the technique used to determine the location information, it can be in the form of latitude, longitude, and/or altitude, or in the form of physical coordinates relative to the base station 122 or some other point of origin, or in any other format. In one embodiment, the context server 126 also provides information indicating a degree or confidence in the established location of the mobile device. In other embodiments, the context server 126 supplies other information related to the given context. For example, if the context is the time of day, then the context server 126 supplies the time that the marker was received from (or sent by) the mobile device 130. In addition, the context server 126 may supply multiple contexts for a single marker, such as the location of the mobile device 130 and the time that the marker was received by the base station 122.

In one embodiment, the context server 126 determines the context by querying the user of the mobile device 130. In order to determine context, the context server 126 can send the mobile device a visual (e.g., textual) and/or audible query for context information. The query can be static and/or dynamic. The user responds to the query by providing input such as key presses, spoken words and phrases, etc.

In one embodiment, the context server 126 determines a set of possible domains for the received marker, and then queries the mobile device 130 (and user of the device) for context information that identifies a particular domain. For example, if the marker is "42, " the context server 126 recognizes that that marker has validity in the cities of San Jose and San Francisco. Therefore, the context server 126 sends the mobile device 130 a dynamically-generated visual and/or audible prompt saying "Press '1' if you are in San Jose. Press '2' if you are in San Francisco." In another embodiment, the context server 126 sends the mobile device 130 a static prompt asking the user to select from among all possible domains for the markers.

In one embodiment, the context server 126 need not identify the possible domains for the marker. Instead, the context server 126 provides the mobile device 130 with an open-ended prompt asking the user to identify the domain. In an embodiment where the user responds to the query with an utterance, such as a spoken word or phrase, or keypress, one embodiment of the context server 126 asks the user to say or spell (using a keypad on the mobile device) the name of the domain (e.g., "Say or spell the name of the city where you are located"). The context server 126 uses voice-recognition techniques to match a spoken response with one of the potential domains.

Although the examples above have assumed that the context server 126 issues the query after receiving the marker, this need not be the case. In some embodiments, the context server 126 queries the user to provide a domain before the user has provided a marker. For example, the context server 126 can issue a query saying "Please say your location." After receiving the name of a location from the user in response to the query, the context server 126 (or another entity in the mobile network support system 120) queries the user for the marker by issuing a prompt such as "Please say the marker."

The mobile network support system 120 further includes a gateway 124 coupled between the base station 122 and the network 101. The gateway 124 is preferably a computer system for performing protocol conversion between different types of networks and/or applications. For example, the gateway 124 preferably converts messages among TCP/IP, WAP, i-Mode, and/or standard telephony protocols. In a preferred embodiment of the present invention, the gateway 124 forms a message containing both the marker 141 and the context information. The gateway 124 then converts the message into a TCP/IP message, such as a Uniform Resource Locator (URL), and passes this message to the network 101 using an established protocol such as the hypertext transport protocol (HTTP). Alternatively, in the embodiment where the gateway 124 communicates with the content server 110 via a standard telephone network, the gateway converts the message into a format designed for communicating the marker 141 and contextual information via the telephone network.

The gateway 124 also preferably converts content received from the network 101 into a wireless communication format such as WML or cHTML, and passes the content to the base station 122 for transmission to the mobile device 130. The gateway 124 may also compress content sent to the mobile device 130 and/or expand messages received from the mobile device 130 to account for the limited bandwidth of radio links. In one embodiment, the functionality of the gateway 124 is incorporated into the context server 126 or another device.

The network 101 transfers information between the gateway 124 and a content server 110. The network 101 can utilize any known networking technology, including technologies designed to carry voice and/or data. In addition, the network 101 may utilize paths over a public network such as the Internet, consist of dedicated and/or private communications link, or include some combination of public and private links. In an alternative embodiment, the content server 110 is located in the mobile network support system 120. Accordingly, the network 101 may be a local area network. In one embodiment, the mobile device user enters a pre-established code into the mobile device in order to specify that a message is intended for the content server 110. For example, the user can enter a short string, such as "##" into the mobile device to signify that forthcoming data contains a marker should be sent to the content server 11 0. In another embodiment, the user can dial a telephone number to connect to the content server 110 and then provide the marker.

The content server 110 preferably receives the marker 141 and the context information, maps the context to a domain, determines the content associated with the marker 141 and the mapped domain, and then either sends the content to the mobile device or performs some other action. In one embodiment, the content server 110 is adapted to receive and respond to communications protocols such as HTTP over TCP/IP. In another embodiment, the content server 110 is an interactive voice response (IVR) system adapted to receive and respond to communications received via standard telephony protocols.

Figure 2:
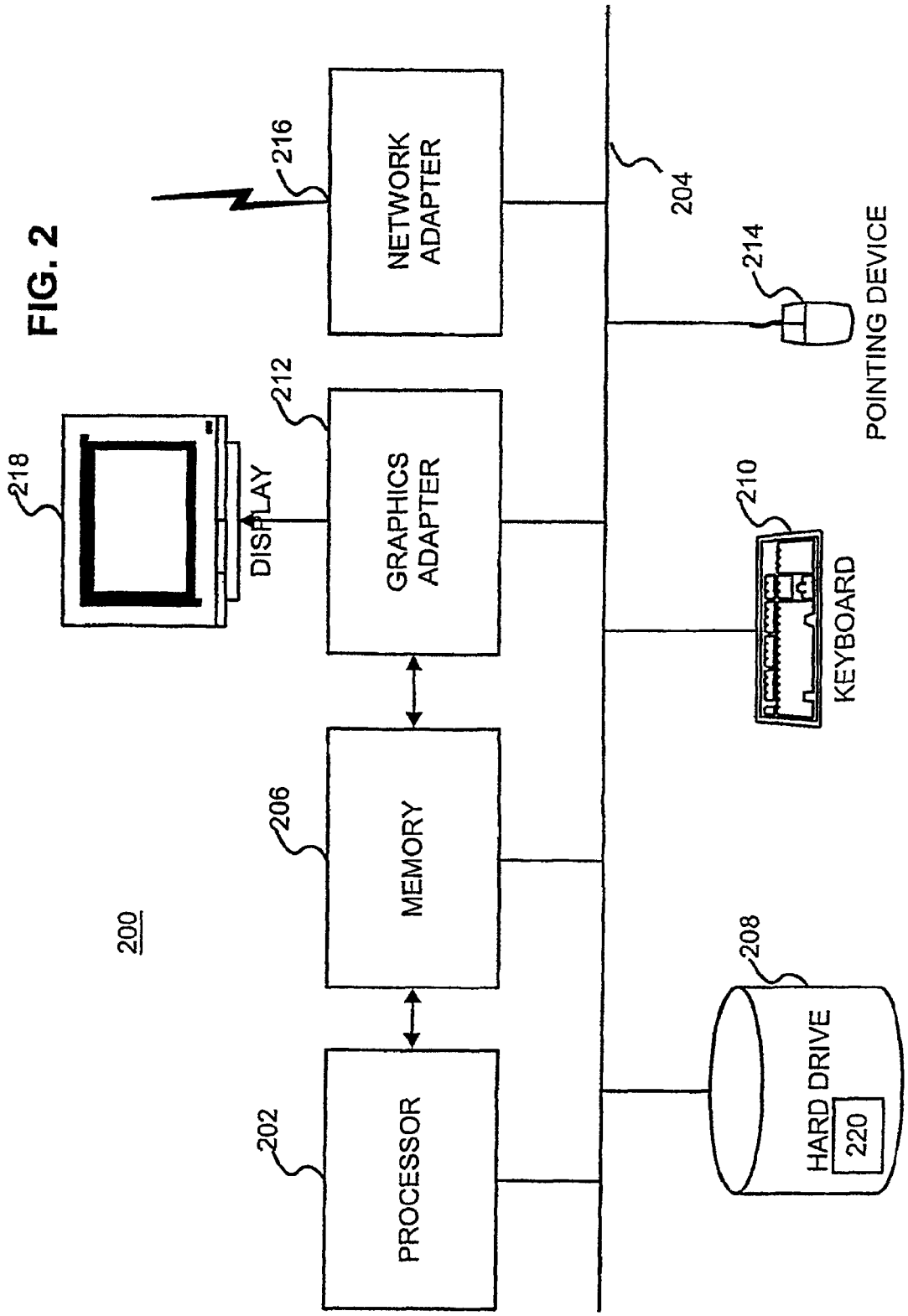
FIG. 2 is a high-level block diagram of a computer system for use as a content server according to one embodiment of the present invention.

FIG. 2 is a high-level block diagram of a computer system 200 for use as the content server 110 or another device illustrated in FIG. 1, such as the context server 126. FIG. 2 illustrates at least one processor 202 coupled to a bus 204. Also coupled to the bus 204 are a memory 206, a storage device 208, a keyboard 210, a graphics adapter 212, a pointing device 214, and a network adapter 216. A display 218 is coupled to the graphics adapter 212.

At least one processor 202 may be any specific or general-purpose processor such as an INTEL x86 or POWERPC-compatible central processing unit (CPU). The storage device 208 may be any device capable of holding large amounts of data, like a hard drive, compact disk read-only memory (CD-ROM), DVD, or some other form of fixed or removable storage device. The memory 206 holds instructions and data used by the processor 202. The pointing device 214 may be a mouse, track ball, light pen, touch-sensitive display, or other type of pointing device and is used in combination with the keyboard 210 to input data into the computer system 200. The network adapter 216 couples the computer system 200 to the computer network 101.

Program modules 220 for providing the functionality attributed to the content (or other) server 110 are preferably stored on the storage device 208, loaded into the memory 206, and executed by the processor 202. Alternatively, hardware or software modules may be stored elsewhere within the computer system 200. As used herein, the term "module" refers to computer program logic and/or any hardware or circuitry utilized to provide the functionality attributed to the modules. The types of hardware and software within the computer system 200 may vary depending upon how the computer system is utilized. For example, a computer system used as a content server 110 is likely to have greater processing power and storage capacity than a typical personal computer system. In addition, the content server 110 may lack certain components, such as a display 218 or graphics adapter.

Returning to FIG. 1, the content server 110 preferably includes a domain mapping module (DMM) 150 and is in communication with a content database 111. The DMM 150 analyzes the context information and domain information to determine a domain for the marker. In one embodiment, a domain database 151 in communication with the DMM 150 holds domain information describing the boundaries and/or conditions defining the domains. In another embodiment, the DMM 150 uses domain information received via a data feed 152 or from another source, in addition to or instead of the information in the domain database 151. In one embodiment of the present invention, the context and the domain are the same. Moreover, the mapping from context to domain can be contiguous or discontiguous.

The context and domain information can explicitly specify the domain for the marker. For example, assume that the context information specifies a geographic location, such as the location of a cell served by a cellular base station or a city, and the domain information specifies geographic boundaries for a variety of domains. In this case, the DMM 150 can determine the domain directly from the context information by using the context (e.g., the geographic location) as a key to the domain information in the domain database 151, or through a similar technique.

The context and domain information can also implicitly specify the domain for the marker. In this case, the DMM 150 preferably analyzes the context and domain information using business logic in order to determine the proper domain for the marker. For example, in one embodiment the context information specifies a geographic location, and the domain information describes the geographic locations where the markers are displayed. The business logic can specify that the DMM 150 select the domain of the matching marker nearest to the location specified by the context information (e.g., if the received marker is "42," the DMM 150 will select the domain of the marker "42" closest to the location specified by the context information). In other embodiments, the business logic can use other techniques to select an implicitly-specified domain.

In addition, the DMM 150 can use a mix of explicit and implicit information to determine the domain for the marker. Assume, for example, that the context information specifies a geographic location, a heading and a velocity. In addition, assume the domain information defines different domains for each side of a road. The DMM 150 interprets the context information and determines that the mobile device 130 is on the road and headed in a certain direction. In addition, the DMM 150 uses the business logic and determines that the received marker is most likely in the domain facing the driver. Accordingly, the DMM 150 maps the marker 141 to that domain.

In yet another example, markers are located on advertisements on the sides of buses. The domains for the markers are specified relative to certain buses or routes. For example, marker "42" is in a first domain for bus routes 1-5 and a second domain for routes 6-10. In this example, the context information specifies a geographic location and/or a time. The domain information specifies a table of bus schedules and/or a real-time data feed describing the locations of buses. The DMM 150 uses the context and domain information, in combination with business logic, to determine which bus bearing the marker was likely seen by the person submitting the marker. Then, the DMM 150 maps the marker to the domain corresponding to the bus route of the given bus.

The content database 111 stores content associated with markers and domains. In one embodiment, the database 111 stores content in a two-dimensional array, with one dimension representing the marker 141 and the other dimension representing the domain. Other storage techniques are within the scope of the present invention, including multi-dimensional arrays, hash tables, etc. In one embodiment of the present invention, the content database 111 stores pointers to additional content. For example, the content database 111 stores URLs referencing other content available on the Internet. In another example, the content database 111 stores phone numbers of reservation services. In one embodiment, the content database 111 is implemented using an object-oriented database such as Oracle 8i available from Oracle Corporation.

In one embodiment, the content database 111 is stored on the storage device 208 in the content server 110. In another embodiment, the content database 111 is stored on a separate storage device associated with a separate database server or a dedicated storage system. Accordingly, the content database 111 may be co-located or remote from the content server 110 and may be coupled to the content server with a local or wide area network (not shown).

Preferably, the content server 110 accesses the content database 111 to retrieve the content identified by the given marker 141 and domain. Upon retrieving the content from the content database 111, the content server 110 preferably provides the content to the mobile device 130 via the network 101 and mobile network support system 120 and/or performs another action with the content. For example, if the content database 111 holds a restaurant menu, the content server 110 may provide the menu to the mobile device 130 or email the menu to an address associated with the mobile device. Alternatively, if the content database 111 holds a phone number for the restaurant, the content server 110 may cause the mobile device 130 to form a telephone connection with the restaurant. If the content server 110 contains an IVR system, the content server may prompt the user to provide additional information.

Figure 3:
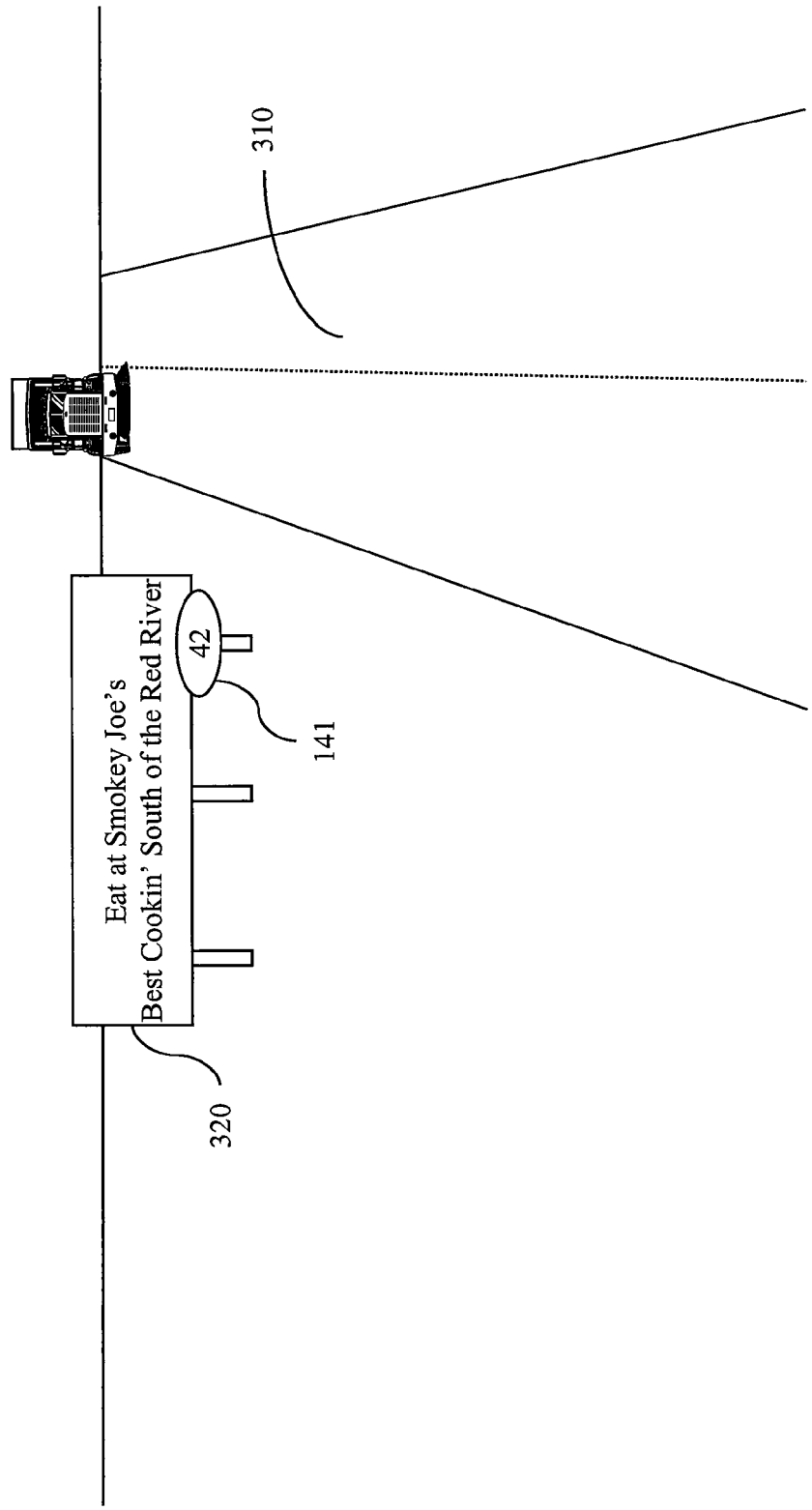
FIG. 3 is a diagram illustrating an exemplary situation in which a mobile device user uses an embodiment of the present invention to obtain desired content.
Figure 4:
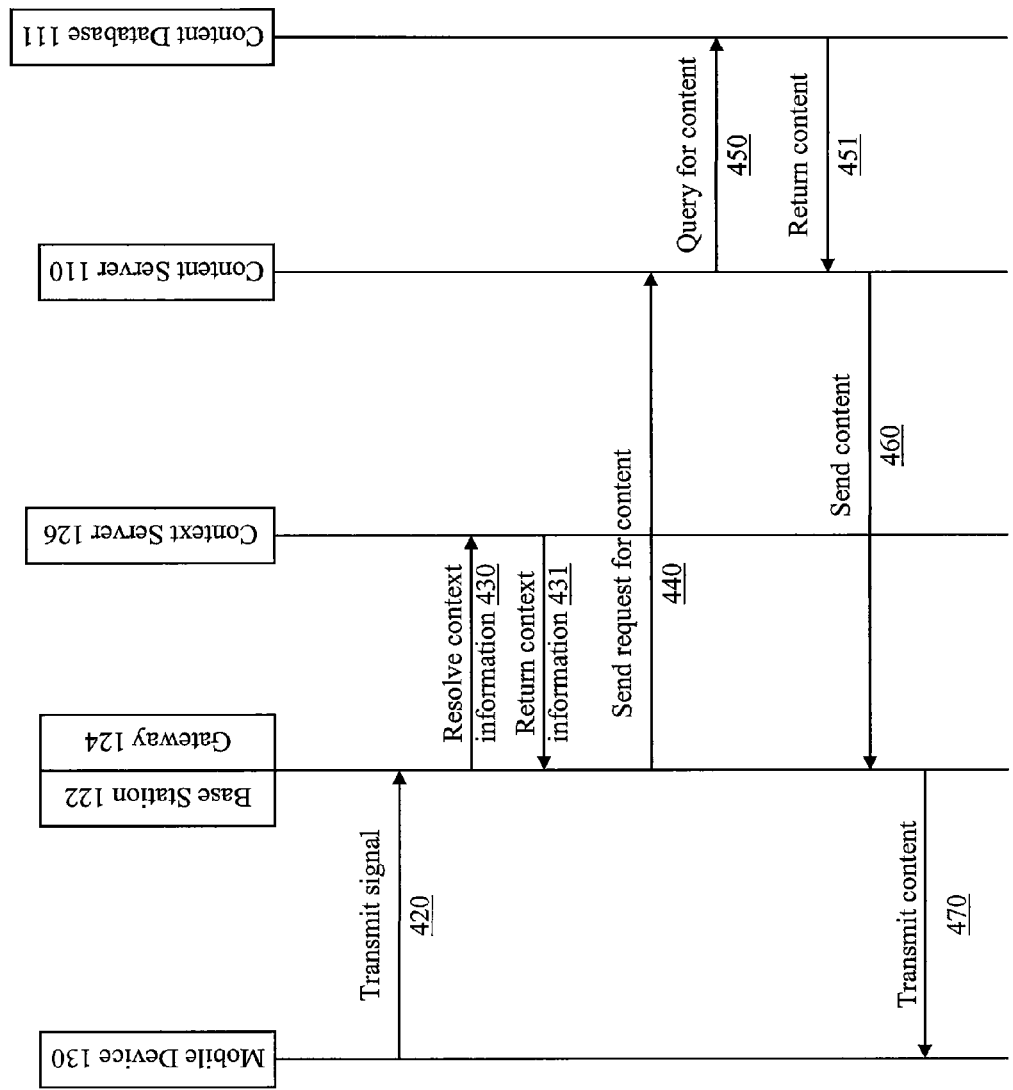
FIG. 4 is a ladder diagram illustrating a process for providing content corresponding to a marker having a context, according to an embodiment of the present invention.

FIG. 3 is a diagram illustrating an exemplary situation in which a mobile device user uses an embodiment of the present invention to obtain a desired content. FIG. 4 is a ladder diagram illustrating communications between the various entities illustrated in FIG. 1 in response to the situation of FIG. 3. FIG. 4 illustrates only major communications and those of ordinary skill in the art will recognize that different embodiments of the present invention may use different sets of communications.

FIG. 3 illustrates an exemplary situation where a mobile device user sees a billboard 320 while driving on a road. The billboard 320 refers to a nearby restaurant, Smokey Joe's. As typically happens, before the mobile device user can read and memorize the direction to the restaurant, or the web address or phone number of the restaurant, which may also be posted on the billboard, the user's car has passed the billboard. However, in this case, the billboard also displays a marker 141 associated with the restaurant. The marker 141 in this example is a two-digit number "42," and it is not hard for the mobile device user to read and memorize this number while driving by the billboard 320. The mobile device user enters this two digit number into the mobile device 130, perhaps by entering "##42" into the device, and, in response, obtains content about Smokey Joe's, such as the direction to Smokey Joe's from the mobile user's location, Smokey Joe's menu, etc.

Turning now to FIG. 4, the signal from the mobile device 130 containing the marker is transmitted 420 to the mobile base station 122, which then forwards 430 the data in the signal to the context server 126. The context server 126 determines the context information and returns 431 it to the gateway 124. In this example, the contextual information is the location of the mobile device. The context server 126 can determine the context information by, for example, querying the user or receiving GPS information from the mobile device 130. The gateway 124 forms a message including Smokey Joe's marker 141 and the location of the mobile device 130, and sends 440 a message to the content server 110 via the network 101. When the network 101 is the Internet, the gateway 124 preferably converts the message from the mobile network protocol, such as the WAP or i-Mode protocol, to an Internet protocol, such as HTTP via TCP/IP. In one embodiment, the message sent to the content server 110 is in the form of a URL, such as "http://contentserver.com/context/42," where "contentserver" corresponds to the name of the content server 110 and "context" corresponds to the location of the mobile device 130.

In response to receiving the message, the content server 110 uses the context information and domain information to map the marker 141 to a domain and then queries 450 the content database 111 for the content corresponding to the marker in the mapped domain. In response to the query, the content database 111 returns 451 the desired content to the content server 11 0. Alternatively, the content database 111 may return a URL pointing to a location on the Internet that the mobile device 130 can access to retrieve this content.

The content server 110 sends 460 the retrieved content to the base station 122, which converts the content into a wireless signal and transmits 470 the signal to the mobile device 130. The mobile device then outputs the content to the mobile device user.

Having described a preferred embodiment of the invention, it will now become apparent to those skilled in the art that other embodiments incorporating its concepts may be provided. It is felt therefore, that this invention should not be limited to the disclosed invention, but should be limited only by the sprit and scope of the appended claims.

We claim:

1. A computer-implemented method for providing content to a mobile device, comprising:
    receiving from the mobile device data representative of a marker, the marker illustrated on a display independent of the mobile device;
    receiving from the mobile device data representative of a context for the marker;
    analyzing the data representative of the context for the marker to determine a domain for the marker;
    determining content responsive to the marker and the domain for the marker, wherein the marker maps to specific content for the domain; and
    providing the determined content to the mobile device.

2. The method of claim 1, wherein receiving data representative of a context for the marker comprises:
    providing the mobile device with a prompt for data describing the context;
    receiving data describing the context generated by a user of the mobile device responsive to the prompt; and
    generating the data representative of the context for the marker responsive to the data describing the context.

3. The method of claim 2, wherein the prompt provides a menu of possible selections and wherein the data describing the context is a selection made from the menu.

4. The method of claim 2, wherein the prompt comprises an open-ended query and wherein the data describing the context comprises an utterance spoken, or at least one keypress entered, by the user of the mobile device responsive to the prompt.

5. The method of claim 1, wherein receiving data representative of a context for the marker comprises:
    receiving data generated by a user of the mobile device responsive to an audible and/or visual prompt.

6. The method of claim 1, wherein the step of determining content responsive to the marker and the domain for the marker comprises the step of:
    accessing a content database holding content associated with a plurality of markers for a plurality of domains, wherein the database includes mappings describing specific content associated with specific markers for specific domains.

7. The method of claim 1, wherein the analyzing step comprises:
    establishing data representative of domain information describing possible domains for the marker;
    establishing business logic describing relationships among the data representative of the context for the marker and the data representative of domain information;
    analyzing the business logic, the data representative of the context for the marker, and the data representative of domain information to determine the domain for the marker.

8. The method of claim 1, wherein the received data representative of a context for the marker describe a geographic location of the mobile device.

9. The method of claim 8, wherein the marker has different meaning in different domains.

10. The method of claim 8, wherein there are a plurality of markers in the domain.

11. A system for providing content to a mobile device, comprising:
    a content database storing content for a plurality of markers, the content associated with one or more of a plurality of domains, and storing mappings describing specific content associated with specific markers for specific domains; and a content server for receiving from the mobile device data representative of a marker, the marker illustrated on a display independent of the mobile device, and data representative of a context for the marker, for analyzing the data representative of the context for the marker to determine a domain for the marker, for accessing the content database to determine content associated with the marker and the domain, and for sending the determined content to the mobile device.

12. The system of claim 11, further comprising:
a context server for providing the mobile device with a prompt for data describing the context, receiving data describing the context generated by a user of the mobile device responsive to the prompt, and generating the data representative of the context for the marker responsive to the data describing the context.

13. The system of claim 12, wherein the prompt provides a menu of possible selections and wherein the data describing the context is a selection made from the menu.

14. The system of claim 12, wherein the prompt comprises an open-ended query and wherein the data describing the context comprises an utterance spoken, or at least one keypress entered, by the user of the mobile device responsive to the prompt.

15. The system of claim 11, wherein the data representative of a context for the marker comprises data generated by a user of the mobile device responsive to an audible and/or visual prompt.

16. The system of claim 11, wherein the content server comprises:
a domain database holding domain information describing possible domains for the marker; and
a domain mapping module in communication with the domain database and adapted to analyze business logic establishing relationships among the data representative of the context for the marker and the domain information to determine the domain for the marker.

17. A computer program product, comprising:
a non-transitory computer-usable medium having executable computer-readable code embodied therein for providing content to a mobile device, the computer-readable code comprising:
a module for receiving from the mobile device data representative of a marker, the marker illustrated on a display independent of the mobile device, and data representative of a context for the marker;
a domain mapping module for analyzing the data representative of the context for the marker to determine a domain for the marker and for accessing a content database to determine content associated with the marker and the domain, wherein the marker maps to specific content for the domain; and
a module for providing the determined content to the mobile device.

18. The computer program product of claim 17, further comprising:
a module for providing the mobile device with a prompt for data describing the context, receiving data describing the context generated by a user of the mobile device responsive to the prompt, and generating the data representative of the context for the marker responsive to the data describing the context.

19. The computer program product of claim 18, wherein the prompt provides a menu of possible selections and wherein the data describing the context is a selection made from the menu.

20. The computer program product of claim 18, wherein the prompt comprises an open-ended query and wherein the data describing the context comprises an utterance spoken, or at least one keypress entered, by the user of the mobile device responsive to the prompt.

21. The computer program product of claim 17, wherein the data representative of a context for the marker comprises data generated by a user of the mobile device responsive to an audible and/or visual prompt.

* * * * *